United States Patent [19]

Maier

[11] Patent Number: 4,841,227
[45] Date of Patent: Jun. 20, 1989

[54] APPARATUS FOR THE RATIOMETRIC MEASUREMENT OF A QUANTITY OF LIQUID IN A TANK

[75] Inventor: Lawrence C. Maier, Middlebury, Vt.

[73] Assignee: Simmonds Precision Products, Inc., Tarrytown, N.Y.

[21] Appl. No.: 55,846

[22] Filed: Jun. 1, 1987

[51] Int. Cl.$^4$ .................. G01R 27/26; G01F 23/00
[52] U.S. Cl. ............................ 324/61 R; 73/304 C
[58] Field of Search ............ 324/61 R, 60 CD, 60 C; 73/304 C, 780; 361/178, 284; 340/618, 620

[56] References Cited

U.S. PATENT DOCUMENTS

| | | | |
|---|---|---|---|
| 4,006,411 | 2/1977 | Akagawa et al. | 324/61 R |
| 4,020,691 | 5/1977 | Franklin | 73/304 C |
| 4,153,873 | 5/1979 | Grindheim | 324/61 R X |
| 4,259,865 | 4/1981 | Myers | 73/304 C |
| 4,583,402 | 4/1986 | Myers et al. | 73/304 C |

*Primary Examiner*—Reinhard J. Eisenzopf
*Assistant Examiner*—Jack B. Harvey
*Attorney, Agent, or Firm*—Cushman, Darby & Cushman

[57] ABSTRACT

Apparatus for the ratiometric measurement of a quantity of liquid in a tank includes first and second capacitors disposed in a tank and responsive to an AC excitation signal. The output signal from the first capacitor corresponds to the quantity of liquid in a tank, while the output signal of the second capacitor corresponds to an empty tank condition. First and second rectifiers are respectively coupled to the first and second capacitors. Preferably, the rectifiers are each a diode pair of opposite polarity diodes. The output signal from each rectifier is thus a current signal. A first current-to-voltage converter is coupled to both the first and second rectifiers and provides a first voltage signal corresponding to the first and second rectified signals. A second current-to-voltage converter is coupled to the second rectifier and provides a second voltage signal corresponding to the second rectified signal. A ratio device is coupled to the outputs of both voltage-to-converters and forms a ratio of the first and second voltage signals to provide an output signal indicative of the quantity of liquid in the tank. This output signal is insensitive to diode characteristics, variations in the excitation voltage and frequency, and produces a true zero output when the sensed quantity of liquid in a tank is zero.

20 Claims, 1 Drawing Sheet

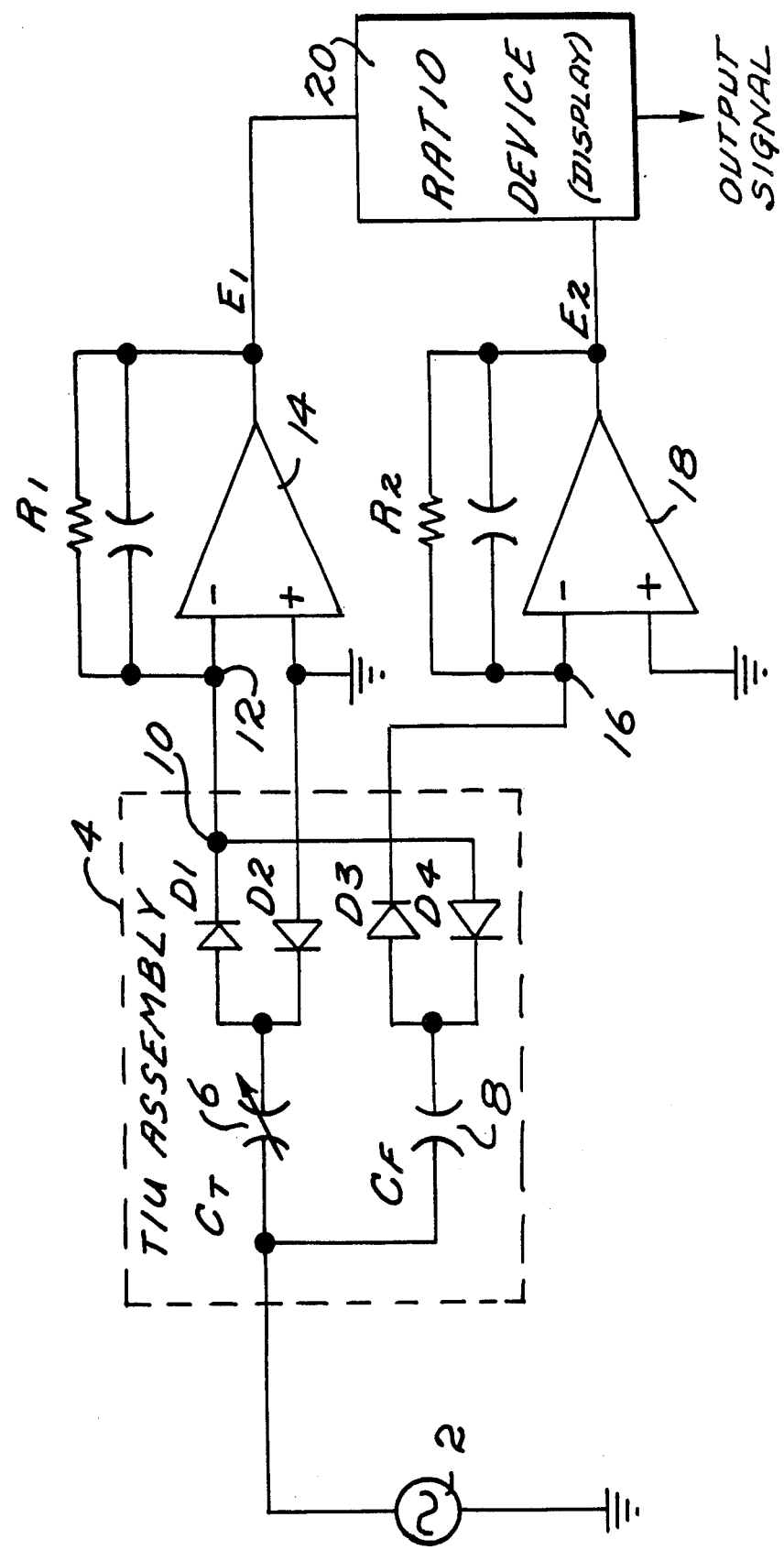

APPARATUS FOR THE RATIOMETRIC MEASUREMENT OF A QUANTITY OF LIQUID IN A TANK

BACKGROUND OF THE INVENTION

The present invention relates to an apparatus for accurately measuring the quantity of liquid in a tank. More particularly, the present invention relates to an apparatus for performing a ratiometric measurement of the liquid quantity in a tank, which apparatus is insensitive to sensor characteristics and excitation voltage and also produces a zero output when the sensed liquid quantity is zero.

Many fluid-gauging systems are known which provide an indication of the quantity of fuel in a fuel tank, and, more particularly, a fuel tank of an aircraft. In known fluid-gauging systems, the level of fluid in the tank is determined by sensing changes in the value of a capacitor located within the tank. The capacitor has two plates separated by an air-gap which is filled or emptied as the level of fluid within the tank changes. The filling or emptying of the air-gap alters the capacitance of the capacitor, thus providing an indication of the level of fuel within the tank. In such known systems, an alternating electric signal is supplied to one plate of the capacitor and the output from the other capacitor plate is provided to a suitable measuring circuit. It is also known to rectify the output signal of the capacitor to provide a sensed signal which is relatively immune to cabling effects. A known method of rectifying the capacitor output signal is to provide a pair of diodes (of opposite polarity) coupled to and in parallel circuit with the capacitor output electrode.

However, difficulties have been experienced with such known systems in that they are extremely sensitive to diode characteristics. Furthermore, any changes in excitation voltage radically alter the accuracy of the capacitor output signal. Finally, such known systems are incapable of providing a true zero output signal when there is no fuel in the tank.

One such known system is described in U.S. Pat. No. 4,259,865 to Myers. Myers discloses a capacitor-sensor located within the fuel tank and coupled to a diode pair for rectifying the capacitor output signal. The rectified signal is then provided to a measuring circuit which includes an operational amplifier driving a display device. Myers addresses the problem of compensating the output signal for variations in the excitation signal, temperature changes within the fluid, and variations in permittivity of the fluid. FIG. 2 of Myers is directed to an apparatus which compensates for temperature variations within the fluid. In FIG. 2, first and second capacitors are provided in the same fuel tank, each coupled to a rectifying diode pair. However, the rectified signal from the first diode pair drives the display device while the rectified signal from the second pair is fed back to the oscillator in order to compensate for variations in the excitation signal. Such a system is extremely sensitive to diode characteristics and will not produce a true zero output signal when the sensed quantity of fuel is zero.

Likewise, FIG. 3 of Myers discloses three capacitors within the fuel tank, each coupled to a rectifying pair of diodes. In FIG. 3, the third capacitor is coupled to a correction circuit which in turn is coupled to the display device and ensures that a true zero output is provided when the quantity of fuel in the tank is zero. However, this device is also extremely sensitive to diode characteristics. Furthermore, a person of ordinary skill in this field readily understands that the apparatus according to FIG. 3 of Myers is complicated, bulky and presents a real reliability risk.

Another example of a known fluid-gauging system is disclosed in U.S. Pat. No. 4,020,691 to Franklin. In Franklin, a single capacitor is located within each fuel tank and is coupled to a corresponding diode pair. One diode from each diode pair is coupled to a switching device which presents a display device with information from whichever tank's capacitor is coupled through the switching device. This display provides an indication of the fuel in each individual tank. The second diode in each diode pair is coupled to a sum circuit which drives a display showing the total quantity of fuel available in all fuel tanks. However, the system of Franklin is subject to the problems of sensitivity to diode characteristics, extreme sensitivity to variations in the excitation signal, and a failure to produce a true zero output when the sensed quantity of fuel is zero.

Other known fluid-gauging systems are disclosed in patents such as, inter alia, U.S. Pat. Nos. 4,583,402 to Myers et al, and 4,145,927 to Larson. Likewise, such known fluid-gauging systems suffer from the problems discussed above.

Therefore, what is needed is a simple, streamlined apparatus capable of reliably, yet accurately indicating the quantity of fuel in a tank without being subject to diode variations, excitation signal changes, and which produces a true zero output when a sensed quantity of fuel in the tank is zero.

SUMMARY OF THE INVENTION

The present invention proposes a simplified apparatus to overcome the problems mentioned earlier.

The invention disposes first and second capacitors within the fuel tank. The first capacitor has a capacitance value which varies in accordance with the quantity of fuel in the tank. The second capacitor has a fixed capacitance value which is predetermined in accordance with an empty tank condition. Both capacitors are driven by an AC generator.

First and second rectifier means are respectively coupled to the first and second capacitors for rectifying the capacitor output signals and providing AC current signals corresponding to the excitation voltages through the capacitors. The rectifier means are preferably diode pairs each having two diodes of opposite polarity coupled in parallel. Preferably, an anode from one of the fixed capacitor diodes is coupled to the cathode of one of the variable capacitor diodes.

The outputs from the rectifier means are provided to first and second current-to-voltage converters, preferably operational amplifiers. The first operational amplifier receives the rectified signals which contains components from both the fixed and variable capacitors. The second operational amplifier receives the rectified signals only from the fixed capacitor. The operational amplifiers now convert the current signals to voltage signals. These voltage signals are provided to a ratio-measuring device which forms a ratio between these voltages. The ratio signal is proportional to the added capacitance of the variable capacitor (which relates to the measured fluid volume) and is independent of the excitation voltage and frequency. Since both sets of diodes are in the same thermal environment, diode effects are also cancelled in the ratio signal. Since the diode characteristics no longer effect the output, much lower excitation voltages may be used without compromising system accuracy.

BRIEF DESCRIPTION OF THE DRAWINGS

The present invention will be more readily understood from the following detailed description of the presently preferred exemplary embodiment, when taken together with the drawing which shows:

The Figure is a schematic diagram of the apparatus according to the present invention.

DETAILED DESCRIPTION OF THE PREFERRED EMBODIMENT

The present invention is directed to DC fuel tank measuring units and provides the benefits of immunity to variations in excitation voltage and frequency, insensitivity to temperature variations and DC diode characteristics even at low excitation voltages, and provides a true zero output when no fuel is sensed in the tank. Previous technology was particularly sensitive to diode characteristic temperature variations, and required relatively high excitation voltages to minimize the effect.

In brief, the present invention consists of a tank measuring unit including a fixed and a variable capacitor. A diode pair is coupled to each capacitor with the diodes of each pair being of opposite polarity. The capacitance of the fixed capacitor is predetermined to be equal to the empty capacitance of the tank unit. This may be accomplished at the factory by connecting the plus diode of the variable capacitor to the minus diode of the fixed capacitor, and the minus diode of the variable capacitor to the plus diode of the fixed capacitor. The fixed capacitor is then adjusted (by selection, trimmer, etc.) until the total current from the assembly is zero when excited by a sine therefor wave, for example, 6 KHz.

The factory calibrated probe assembly is then installed into a fuel tank using three wires and two DC amplifiers. The positive diode of the variable capacitor and the negative diode of the fixed capacitor are connected to one DC amplifier. The minus diode of the variable capacitor is connected to the DC amplifier ground reference. The plus diode of the fixed capacitor is coupled to the second DC amplifier. Naturally, all diodes may be reversed to change polarity of the signal, if desired. The ratio of the outputs of the two DC amplifiers is now proportional to the added capacitance of the tank unit and accurately provides an output of the fluid volume within the tank. Since the signal is a ratio, it is independent of the excitation voltage and frequency and independent of diode thermal effects. Since diode characteristics no longer adversly effect the output, a much lower excitation voltage may be used.

The FIGURE depicts the schematic diagram according to the present invention. Signal generator 2 provides an AC, sine wave signal at a predetermined rate. For example, a 6 KHz signal may be used. Signal generator 2 may be a sine wave oscillator or any other known or convenient means for generating the sine wave excitation voltage.

Within the tank unit assembly (T/U assembly) 4, is disposed a variable capacitor 6 having a capacitance value $C_T$. Also disposed within T/U assembly 4 is fixed capacitor 8 which has a capacitance value of $C_F$. One plate of each of capacitors 6 and 8 is provided with the excitation voltage from signal generator 2. The second plate of capacitor 6 is coupled to first rectifying means D1, D2, while the second plate of capacitor 8 is coupled to second rectifying means D3, D4.

In general, the current through a capacitive sensor excited by a sine wave of frequency $\omega$ is as follows:

$$I = E\omega C \quad (1)$$

where E is the peak voltage of the excitation source, and C is the capacitance of the sensor.

If a diode is inserted in series with this current, only positive or negative half cycles of the current will flow dependent upon the orientation of the diode. A positive and a negative diode are used in a pair to preserve AC current flow through the capacitive sensor. However, the diodes are used to steer positive current pulses to one return point, and the negative current pulses to another (or the same) return point. If the current out of one diode is returned to the summing node of an operational amplifier with low pass filter characteristics and a feedback resistor of value R, then only the DC component of the current remains and the rectified output voltage will be DC and as follows:

$$V_{DC} = -E\,\omega CR/\pi \quad (2)$$

The above-stated relationships are well-known by those versed in the art.

In general, the concept and advantages of a capacitive sensor with diodes is well-known. The benefits include simple signal conditioning and the elimination of a shielded cable for the output signal. However, such known systems are still sensitive to the value of the excitation voltages, to changes in the diode characteristics, and produce an output even when the sensed quantity of fuel is zero. The present invention proposes to use the steering ability of the diodes to produce a capacitive sensor system which is insensitive to diode characteristics, excitation voltage and frequency, and which produces a true zero output when the sensed quantity is zero.

The capacitance value of capacitor 6 may be quantified as follows:

$$C_T = \alpha(K-1)C_{at} + C_{et} \quad (3)$$

where:
$\alpha$ = the height of the sensed dielectric material (e.g., the fuel)
K = the dielectric constant of the material (e.g., the fuel dielectric constant),
$C_{at}$ = the active capacitance of the sensor and is a constant, and
$C_{et}$ = the sensor capacitance in air which is also a constant.

As described above, when the sensor assembly is built, diodes D1 and D4 are tied together and diodes D2 and D3 are also tied together. The sensor is then excited by a sine wave source and the capacitance value of capacitor 8 is adjusted such that the total output current of each diode pair is zero. Therefore, the following relationship holds:

$$C_F = C_{et} \quad (4)$$

The output current from capacitor 6 through diode D1 is as follows:

$$\text{DC current }_{D1} = E\omega C_T/\pi. \quad (5)$$

Likewise, the DC current from capacitor 8 through diode D4 is as follows:

$$\text{DC current}_{D4} = -E\omega C_F/\pi \tag{6}$$

The output currents through diodes D1 and D4 are summed at node 10 and directed to the summing junction 12 of operational amplifier 14. The output of operational amplifier 14 is a voltage signal $E_1$. Since the inverting input of operational amplifier 14 receives DC current from both diodes D1 and D4, the output voltage $E_1$ of operational amplifier 14 may be calculated as follows:

$$E_1 = -(C_T - C_F)(E\omega R1)/\pi \tag{7}$$

where R1 = the resistance value of resistor R1 in the feedback path of operational amplifier 14.

Since $C_F = C_{et}$ (see equation (4)), and since equation (3) may be restated as follows:

$$C_{et} = C_T - \alpha(K-1)C_{at} \tag{8}$$

then, the output voltage $E_1$ of operational amplifier 14 may be stated as follows:

$$E_1 = -\alpha(K-1)C_{at}(E\omega R1)/\pi \tag{9}$$

In a like manner, the DC current through diode D3 may be stated as follow:

$$\text{DC current}_{D3} = E\omega C_F/\pi \tag{10}$$

Since $C_F = C_{et}$ (see equation (4)), DC current through diode D3 may be stated as follows:

$$\text{DC current}_{D3} = E\omega C_{et}/\pi \tag{11}$$

The DC current from diode D3 is provided to the summing node 16 of operational amplifier 18. Thus, the inverting input of operational amplifier 18 receives the DC current from diode D3. Operational amplifier 18 includes a feedback path having a resistor R2 of resistance value R2. The non-inverting input of operational amplifier 18 is coupled to ground. Thus, the output of operational amplifier 18 is a voltage signal $E_2$. This voltage signal $E_2$ may be calculated as follows:

$$E_2 = -E\omega E_{et} R2/\pi \tag{12}$$

Thus, equations (9) and (12) provide output voltage signals reflecting the level of quantity of fuel in the tank and a fixed capacitance predetermined based on an empty tank. By forming a ratio of the voltage signals from each operational amplifier, the disadvantageous effects of diode characteristics and excitation voltage variations may be eliminated. The ratio of the first voltage signal $E_1$ to the second voltage signal $E_2$ may be calculated as follows:

$$E_1/E_2 = \frac{\alpha(K-1)C_{at}(E\omega R1)/\pi}{E\omega C_{et} R2/\pi} \tag{13}$$

$$= \alpha(K-1)C_{at} R1/C_{et} R2 \tag{14}$$

Since $C_{et}$ and $C_{at}$ are known constants, and if R1 and R2 a known ratio (ratio-matched resistors are well known), then the resulting value is independent of excitation voltage E, excitation frequency $\omega$, diode variations (which appear as excitation voltage changes), and produces an output of zero when the measured parameter (the fuel height $\alpha$) is in fact zero. In fact, if R1 and R2 are selected to be accurate and stable resistors, then the ratio output signal is only dependent on the desired measured parameter which is the product $\alpha(K-1)$. Needless to say, it is ratio device 20 which performs the necessary ratio calculations and provides the appropriate output signal.

Thus, what has been described is a simplified, streamlined structure for providing a very accurate output signal indicative of the level of fuel within a tank. The output signal is immune to variations in excitation voltage and frequency, diode characteristics, and produces a true zero output signal when no fuel is in the tank. However, persons of ordinary skill in this field readily understand that a wide variety of modifications may be made to the subject invention without departing from the spirit and scope of the attached claims. For example, ratio device 20 may be a display unit, a microprocessor, or any known and convenient device for performing the ratio operations and providing the appropriate output signal.

While the invention has been described in connection with what is presently considered to be the most practical and preferred embodiments, it is to be understood that the invention is not to be limited to the disclosed embodiment, but on the contrary is intended to cover various modifications and equivalent arrangements included within the spirit and scope of the appended claims which scope is to be accorded the broadest interpretation so as to encompass all such modifications and equivalent structures.

What is claimed:

1. Apparatus for measuring a quantity of a liquid in a tank, comprising:
    first and second capacitive transducer means disposed in a tank and responsive to an AC signal for providing first and second measurement signals, said first measurement signal corresponding to said quantity of liquid in said tank, said second measurement signal corresponding to an empty tank;
    first and second rectifier means coupled, respectively, to said first and second transducer means, for respectively receiving said first and second measurement signals and providing first and second current signals;
    first current-to-voltage converter means having a first input coupled to said first and second rectifier means, for receiving said first current signal and a portion of said second current signal, and for providing a first voltage signal corresponding to said first and second measurement signals;
    second current-to-voltage converter means, coupled to said second rectifier means, for receiving another portion of said second current signal, and for providing a second voltage signal corresponding to said second measurement signal; and
    means for forming a ratio of said first and second voltage signals to provide an output signal indicative of said quantity of liquid in said tank.

2. Apparatus according to claim 1 wherein said second capacitive transducer means comprises a capacitor having a predetermined value corresponding to a capacitance of an empty tank.

3. Apparatus according to claim 1 wherein said first and second rectifier means each comprises a diode pair coupled in parallel but with opposite polarity, and wherein a first pole of a diode in the first pair is coupled to a second pole, of opposite polarity to said first pole, of a diode in the second pair.

4. Apparatus according to claim 3 wherein the diodes of said first and second pair which are coupled in parallel are further coupled to said first current-to-voltage converter means.

5. Apparatus according to claim 1 wherein said first capacitive transducer means comprises capacitor means for providing an alternating first measurement signal whose value varies with the quantity of liquid in said tank.

6. Apparatus according to claim 1 further including generator means for providing said AC signal to said first and second transducer means.

7. Apparatus for measuring a quantity of liquid in a tank, comprising:
generating means for generating an AC excitation signal;
first and second capacitive sensor means, disposed in said tank and coupled to said generating means, for respectively providing first and second alternating measurement signals, said first measurement signal corresponding to said quantity of liquid in said tank, said second measurement signal corresponding to an empty tank;
first and second diode pairs respectively coupled to said first and second sensors, for respectively receiving said first and second measurement signals and providing first and second current signals, said first current signals corresponding to said first measurement signal and said second current signals corresponding to said second measurement signal;
first operational amplifier means, having a first input coupled to said first and second diode pairs, for receiving said first current signals and a portion of said second current signals, and for converting the received current signals into a first voltage signal;
second operational amplifier means, coupled to said second diode pair, for receiving another portion of said second current signals, and for converting the received another portion current signals into a second voltage signal; and
ratio means, coupled to said first and second operational amplifier means, for forming a ratio of said first and second voltage signals to provide an output signal indicative of said quantity of liquid in said tank.

8. Apparatus according to claim 7 wherein said first diode pair comprises first and second diodes, said second diode pair comprises third and fourth diodes, each diode having first and second poles of opposite polarity, and wherein the first pole of said fourth diode is coupled to a node which is also coupled to the second pole of said first diode.

9. Apparatus according to claim 8 wherein said first operational amplifier has (1) a first feedback path, (2) said first input coupled to said node and to said first feedback path, and (3) a second input coupled to second diode and to ground.

10. Apparatus according to claim 9 wherein said second operational amplifier has (1) a second feedback path, (2) a first input coupled to said third diode and to said second feedback path, and (3) a second input coupled to ground.

11. Apparatus according to claim 10 wherein said first feedback path includes first resistor means, said second feedback path includes second resistor means, and wherein said first and second resistor means are matched at a predetermined ratio of resistance values.

12. Apparatus according to claim 7 wherein said first capacitive sensor means comprises a first capacitor whose capacitance value varies in accordance with said quantity of liquid in said tank, and wherein said second capacitive sensor means comprises a second capacitor whose capacitance value is fixed at a predetermined value corresponding to an empty tank.

13. Apparatus according to claim 7 wherein each said diode pair comprises first and second diodes coupled in parallel but with opposite polarity.

14. Apparatus for measuring a quantity of fuel in a fuel tank, comprising:
signal generator means for generating an AC excitation signal;
a first capacitor having a first electrode coupled to said generator means, and a second electrode providing a first measurement signal whose value varies in accordance with said quantity of fuel in said tank;
a second capacitor having a first electrode coupled to said generator means, and a second electrode providing a second measurement signal whose value corresponds to an empty tank;
a first diode having an anode coupled to said first capacitor second electrode, and a cathode coupled to a node;
a second diode having a cathode coupled to said first capacitor second electrode, and an anode;
a third diode having an anode coupled to said second capacitor second electrode, and a cathode;
a fourth diode having a cathode coupled to said second capacitor second electrode, and an anode coupled to said node;
first current-to-voltage converter means, coupled to said node and to said second diode anode, for providing a first voltage signal corresponding to said quantity of fuel in said tank;
second current-to-voltage converter means, coupled to said third diode cathode and ground, for providing a second voltage signal corresponding to an empty tank; and
ratio means, coupled to said first and second current-to-voltage means, for forming a ratio of said first and second voltage signals, and for providing an output signal indicative of said quantity of fuel in said tank.

15. Apparatus according to claim 14 wherein said first capacitor has a dielectric formed at least in part by said fuel, and wherein a capacitive impedance of said first capacitor depends on said quantity of fuel.

16. Apparatus according to claim 14 wherein said first current-to-voltage converter means comprises:
a first operational amplifier having a first input coupled to said node, a second input coupled to said second diode anode and to ground, and an output; and
a first feedback path coupled between said first operational amplifier output and said node, said first feedback path containing a first resistor.

17. Apparatus according to claim 16 wherein said second current-to-voltage converter means comprises:
a second operational amplifier having a first input coupled to said third diode cathode, a second input coupled to ground, and an output; and
a second feedback path coupled between the output and first input of said second operational amplifier, said second feedback path containing a second resistor.

18. Apparatus according to claim 17 wherein said first and second resistors are matched with a predetermined ratio of resistance values.

19. Apparatus according to claim 17 wherein the first and second inputs of both said first and second operational amplifiers are respectively inverting and non-inverting inputs.

20. Apparatus according to claim 14 wherein said second capacitor has a capacitive impedance which is fixed at a predetermined value corresponding to an empty tank.

* * * * *